Figure 1:
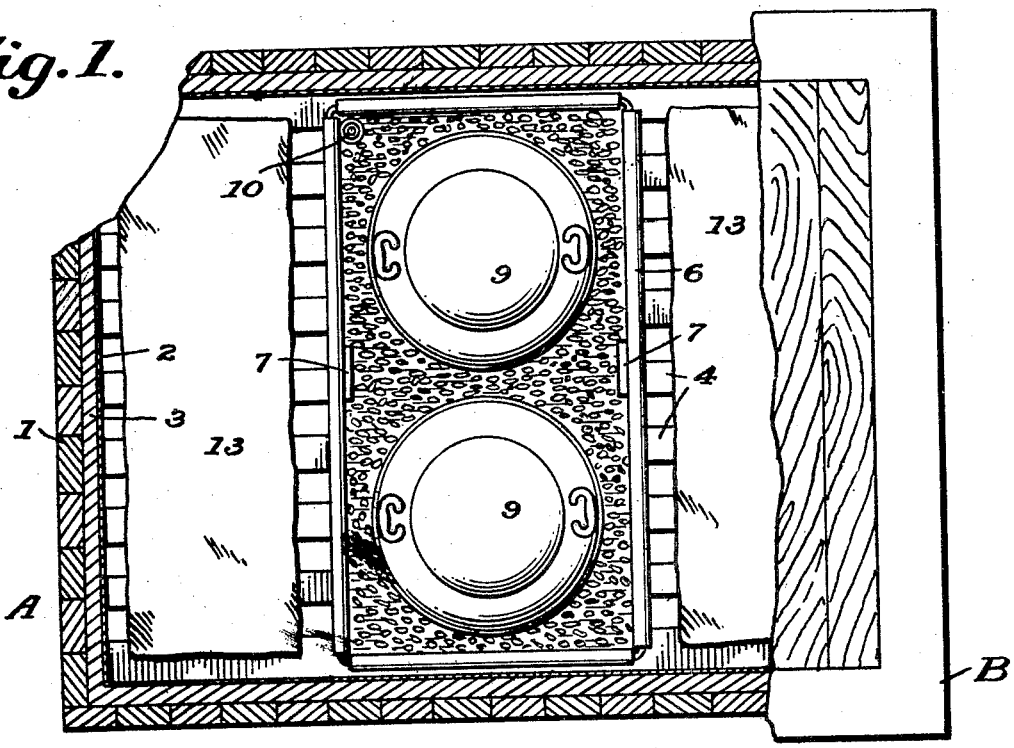

Nov. 6, 1934.    W. J. M. WROTEN    1,979,785
MILK COOLER
Filed Jan. 16, 1933

Inventor
WILLIAM J. M. WROTEN.

By Milans & Milans
Attorneys.

Patented Nov. 6, 1934

1,979,785

UNITED STATES PATENT OFFICE 1,979,785

MILK COOLER

William J. M. Wroten, Clayton, Del.

Application January 16, 1933, Serial No. 652,053

1 Claim. (Cl. 62—79)

My invention relates to new and useful improvements in milk coolers and more particularly to a device of this character primarily intended for use by dairy farmers although it will be understood that it might equally as well be used by others.

The primary object of the invention resides in the provision of a milk cooler in which the milk may be quickly cooled to a temperature below the temperature demanded by the milk companies and health departments.

A further object of the invention resides in the provision of a milk cooler in which the milk can or cans containing the milk is placed into a container in which there is water or chipped ice, the container being positioned within an ice box having a hinged cover and in which blocks of ice are stored, preferably, on opposite sides of the container.

Still another object of the invention resides in the provision of means for taking care of any over-flow of water within the container as well as means for discharging water from the bottom of the ice box.

With the above and other objects in view, which will appear as the description proceeds, my invention consists in the novel details of construction, and arrangement of parts, described in the following specification and illustrated in the accompanying drawing, and while I have illustrated and described the preferred embodiments of the invention, as they now appear to me, it will be understood that such changes may be made as will fall within the scope of the appended claim.

Figure 2:
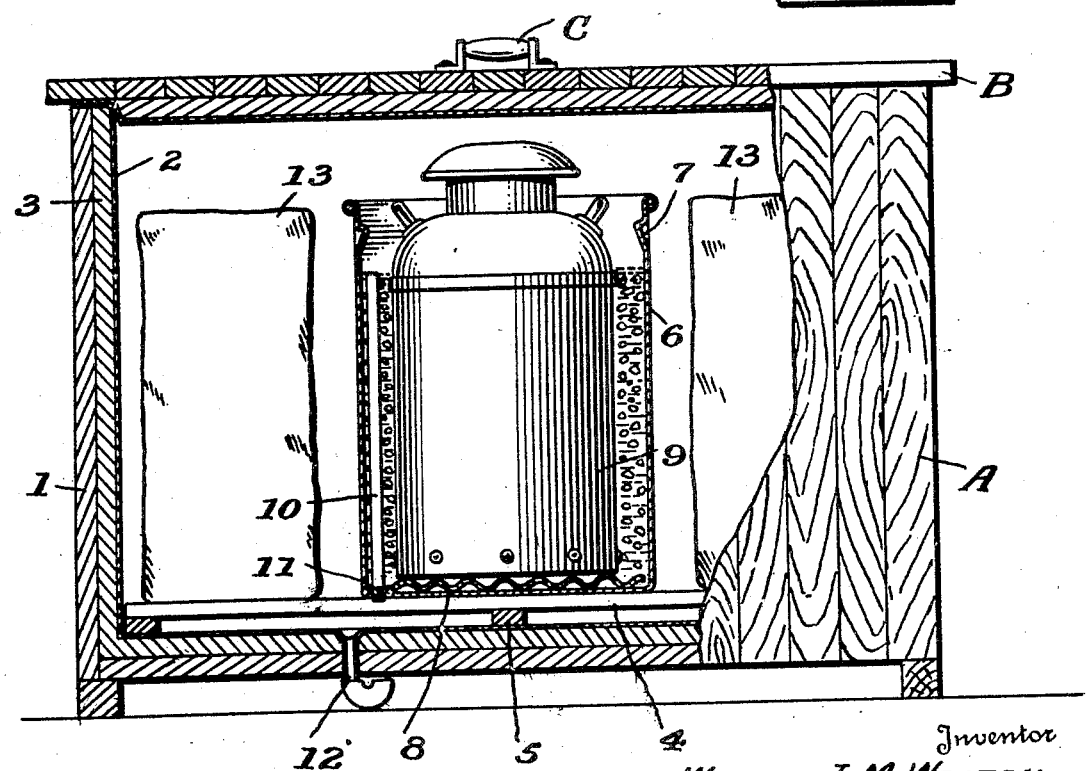

In the drawing:

Fig. 1 is a top plan of the ice box with portions of the top or cover broken away to show the interior construction and arrangement; and Fig. 2 is a front elevation with parts broken away and parts shown in vertical section and side elevation.

In the drawing A denotes the ice box having the hinged cover B provided with a hand grip C whereby the cover may be raised to gain access to the box. The box A and cover B, as shown consist of the outer casing 1 of wood, the inner lining 2 of metal, and the intermediate packing 3 of celotex or similar material, the celotex packing being preferably waterproof. Within the ice box A is positioned a grate consisting of the longitudinally extending bars 4 and the transversely extending bars 5, this grate or grating supporting the metal container indicated at 6, this metal container being of elongated formation, as shown more particularly in Fig. 1 of the drawing, and provided in its sides with the depressions 7 forming handholds whereby the container may be removed at will. In the bottom of the container I position a corrugated plate 8 which is of a shape corresponding to the shape of the container 6 and this corrugated plate forms a support for the milk cans 9 which are placed within the container so that the milk contained therein may be cooled. Preferably the container 6 is partially filled with chipped ice which when the cans are placed in the container assumes the height indicated generally in Fig. 2 of the drawing, but when desired instead of using the chipped ice water may be used for the purpose of cooling. At 10 I have indicated a standpipe which is threaded into the bottom of the container as shown at 11, this standpipe taking care of any over-flow of water within the container 6. At 12 I have shown a drain pipe leading from the bottom of the ice box so that any water within the box may be drained therefrom.

Blocks of ice, shown at 13, are stored in the box A on opposite sides of the container 6 and when desired ice may be chipped from the stored blocks of ice to be placed into the container 6.

From the above detailed description it is thought that the construction of my cooler will be readily understood. At present the health authorities and milk companies require the dairy farmers to deliver the milk which is cooled to a low temperature and while I am aware that previously milk has been cooled by placing the cans containing the same in water or placing the cans into a box containing ice, nevertheless so far as I am aware it is entirely new with me to place the milk cans in a separate container containing chipped ice or water and such water as melts from the chipped ice or such water as is initially placed into the container is kept at a low temperature by means of ice stored within the box in blocks. It is a well-known fact that water will maintain a relatively low temperature considerably longer than will air. Therefore the water from the chipped ice or the water initially placed into the container will be maintained at a low temperature by the blocks of stored ice and the milk contained in the milk cans, placed into the containers, will be quickly lowered in temperature as required. In other words if the milk cans were merely placed into an ice box containing the blocks of ice the air would not be maintained as cold as is the case with the water in the container and at the same time the cold air would escape from the box very quickly when the top or cover should be raised. At the same time if the milk cans were merely placed into a container filled with water the low temperature of the water would be quickly raised. In other words the blocks of stored ice in my ice box maintain the water within the container at a continuous low temperature and quickly chills or cools the milk within the cans. I have found by actual tests that the cooler may be economically maintained and that the milk is more quickly chilled or cooled by the combined use of the container with water and the stored blocks of ice than would be the case if the cans containing the milk were merely placed into a container filled with water or into an ice box containing stored ice.

Having fully described my invention what I claim as new and desire to secure by Letters Patent is:—

A milk cooler of the character described including an outer receptacle for dry storage of blocks of ice, the ice maintaining the air within the receptacle at a relatively low temperature, a readily removable container positioned within the outer receptacle in close proximity to the blocks of ice, a cooling medium received in the removable container, and a removable can positioned in the removable container and submerged in the cooling medium therein, the cooling medium in the removable container being maintained at a relatively low degree by the air in the outer receptacle.

WILLIAM J. M. WROTEN.